Jan. 5, 1971 W. J. ZENNER 3,553,650

PROGRAM UNIT FOR DATA EDITING SYSTEM

Filed Dec. 4, 1967 2 Sheets-Sheet 1

INVENTOR
WALTER J. ZENNER
BY Wallace, Kinzer & Dorn
Attys.

Jan. 5, 1971 W. J. ZENNER 3,553,650

PROGRAM UNIT FOR DATA EDITING SYSTEM

Filed Dec. 4, 1967 2 Sheets-Sheet 2

INVENTOR
WALTER J. ZENNER
BY Wallace, Kinzer & Dorn
Attys.

3,553,650

PROGRAM UNIT FOR DATA EDITING SYSTEM

Walter J. Zenner, Des Plaines, Ill., assignor to Extel Corporation, Chicago, Ill., a corporation of Delaware Filed Dec. 4, 1967, Ser. No. 687,898
Int. Cl. G06f *9/02*
U.S. Cl. 340—172.5 8 Claims

ABSTRACT OF THE DISCLOSURE

An interchangeable program unit for a data editing system using a conventional multi-level data code, including a predetermined number of parallel energizing circuits for energizing an output control device. In each energizing circuit there are a plurality of electrical connector members each provided with three individual electrical connector elements for each code level with two of the connector elements individually connected to a switch and the remaining electrical connector element connected to a conductor that is in series with the energizing circuit. Each connector unit holds a removable printed circuit program card that encodes the connector unit in accordance with the code for a particular identifying character by selectively connecting the individual electrical connector elements to the switch. The program member also includes a simple series connection for two extra connector elements used to prevent completion of the energizing circuit when there is no program card present.

BACKGROUND OF THE INVENTION

This invention relates to a new and improved program unit for an editing system applied to the monitoring of stock market quotations, commodity quotations, or like data.

In a given instance, it may be desirable to maintain a continuous check on the price fluctuations of a limited number of different stocks or commodities. The basic data is usually available in a general series of quotations, of which the quotations to be monitored may constitute only a relatively minor part. Continuous review of a general quotation service of this kind is generally time-consumming and wasteful. A particularly advantageous system for editing this kind of information to limit the data requiring consideration to those stocks or commodities in which the user has a particular interest is described and claimed in Pat. No. 3,249,922 to P.G.S. Mero issued May 3, 1966.

A particular user may frequently find it necessary to change the listing of stocks or commodites to be monitored by an editing system of the kind discussed above. For example, if the editing system is being utilized as a part of an investment service, a change in the investment portfolio will necessitate a change in the monitoring operation, either by addition, subtraction, or substitution of a particular item of data to be monitored. If the program unit for the editing system is constructed with permanent wiring, the required change in programming becomes difficult and expensive. If conventional programming units such as plugboards are employed, a change of program may be somewhat easier to accomplish, but may still be quite difficult for an inexperienced user of the equipment. This is particularly true because the user may be a person engaged in a commercial business with no background in the electrical arts.

Another difficulty encountered in connection with the programming of a data editing system is derived from the fact that the number of data characters identifying a particular quotation, in a general quotation service, is not necessarily uniform. A given security might be identified, for example by a single letter, a two letter combination, or a three letter combination. The program unit must be capable of accurately identifying a particular quotation based upon any of these three possible conditions and upon any of the many multiples of character combinations that may be employed for each data item identification. Otherwise, the editing operation is incomplete and ineffective and the system does not serve its intended purpose.

Any user of a data editing system of the kind to which the present invention is directed will be quite capable of changing the program for the system if this can be accomplished on a simple and straightforward character-by-character basis. Thus, given three individual sockets or receptacles, the user can insert program elements that are identified by character into the sockets in a particular sequence to identify a given quotation to be monitored. This is true of punctuation as well as letter or numeral characters. The same user, however, might have substantial difficulty in programming the same equipment if it were required that this be done on the basis of the codes actually utilized for transmission of the quotation information. Furthermore, a breakdown on the basis of individual characters is more practical and economical than if the program unit revision is accomplished on the basis of a complete data item identification, since the latter might require the preparation of as many as several thousand separate and distinct program members instead of the limited number required to represent the alphabetic and numeric characters and one or two punctuation characters.

SUMMARY OF THE INVENTION

It is a principal object of the present invention, therefore, to provide a new and improved program unit for a data editing system in which an unskilled user can substitute, at will, and in a minimum time, a new identification of a stock or commodity quotation that the user desires to monitor, on the basis of individual characters.

Another object of the invention is to provide a new and improved program unit for a data editing system in which individual portions of the program are determined by separate inexpensive printed circuit elements that can be quickly and conveniently inserted in or removed from simple electrical connectors to change the data editing program.

Another object of the invention is to provide a new and improved program unit for a data editing system which, while affording maximum versatility, requires a minimum expenditure in manufacture coupled with substantially complete reliability.

The program unit of the present invention is incorporporated in a data editing system that selects individual data items from a continuing stream of data signals in which each data item is identified by at least one specific character but no more than $n$ identifying characters, the data items being encoded in accordance with a given multi-level data code. The system in which the program unit is incorporated further includes switching means comprising $n$ groups of switching devices actuated in accordance with the data signals, one switching device for each code level, and an output control device that may be employed to control a printer or other output apparatus. The program unit comprises a predetermined number of parallel energizing circuits for the output control device, each of the energizing circuits being capable of actuating the output control device to initiate an output function. A plurality of $n$ electrical connector members are incorporated in each energizing circuit, each connector member electrically connecting the energizing circuit to all of the switching devices in one of the aforesaid groups. A multiplicity of individual program members are provided, each encoded in accordance with a particular identifying character code; each program member is removably mountable in one of the electrical connector members to encode that connector member in accordance with the code for a specific identifying character. The interconnection between the electrical connector members, the program members, and the switching devices is such that each of the parallel energizing circuits can only be completed in response to actuating of the switching devices in accordance with a desired combination of from one to $n$ identifying characters.

DESCRIPTION OF THE PREFERRED EMBODIMENTS

Figure 1:
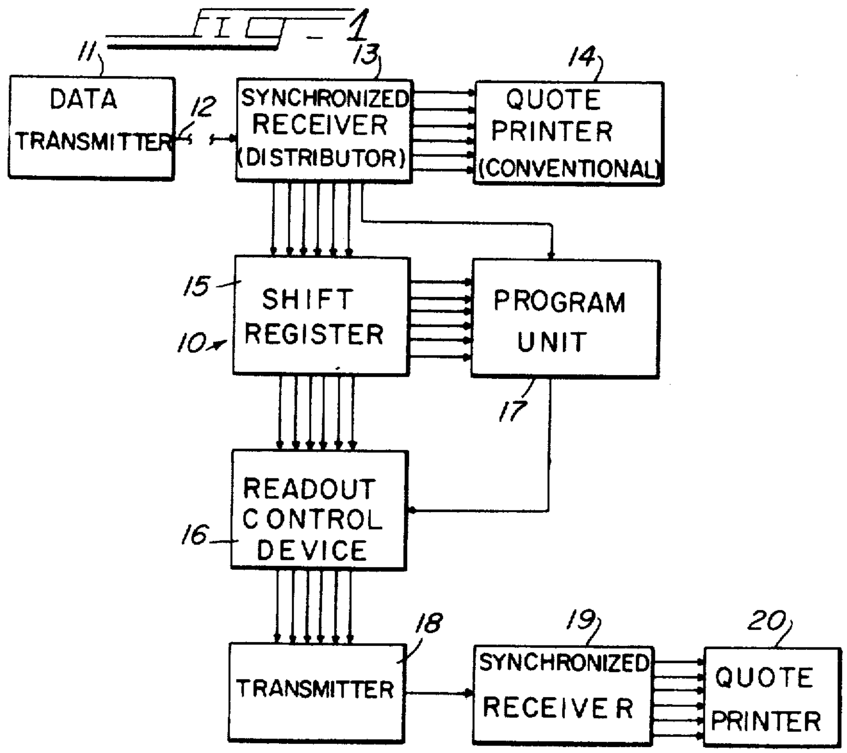
FIG. 1 is a block diagram of a data editing system in which a program unit constructed in accordance with the present invention may be incorporated.

FIG. 1 illustrates a data editing system, constructed in accordance with the aforementioned Mero Pat. No. 3,249,922, intended for monitoring stock market quotations, commodity quotations, and the like. System 10 comprises a data transmitter 11, which may be of conventional construction. Transmitter 11 encodes financial quotations, such as stock market or commodity quotations, in accordance with a conventional start-stop permutation code of the kind used for stock "ticker" operation. Assuming that a code like the conventional stock market quotation code is employed, transmitter 11 encodes the data in accordance with a six-level code, the sixth code level being employed to indicate whether alphabetic or numeric information is being transmitted. Additional code levels may be employed for synchronization purposes in the transmission, but are not discussed in detail because they do not convey quotation data. A "space" code indication in the sixth level of the code designates the transmission of alphabetic characters whereas a "mark" indication in the sixth level of the code identifies the transmission of numerical data.

Transmission 11 is coupled to a synchronized receiver or distributor 13 by a suitable communication link 12, which may be a wire line or any other appropriate transmission link. Distributor 13 may also be of substantially conventional construction. The signals received at the distributor 13 are sequential in form and the distributor is operated in synchronism with transmitter 11 to reproduce the code data initially available at the transmitter. As in a conventional system, distributor 13 may be connected to a printing apparatus 14 that prints all of the stock market, commodity, or other financial quotations without deletion. Inasmuch as the distributor and the printer may comprise apparatus that is quite well known in the art, neither is described in detail herein. It should be noted that distributor 13 may be a synchronized mechanical device, as described in Mero Pat. No. 3,249,922, or may comprise an electronic apparatus synchronized with the transmitter to achieve the same functions.

Distributor 13 is also connected to the first stage of a shift register 15. Shift register 15 comprises a plurality of stages, the received data from distributor 13 being transferred sequentially through the stages for transmission to an output control device shown in FIG. 1 as the readout control unit 16. Shift register 15 includes at least as many stages as the maximum number of identifying characters in each data item that is to be identified and printed on a selective basis by the data editing system 10, and preferably includes one additional stage for convenience in readout operation.

In the following detail description of the present invention, and particularly in connection with FIGS. 1 and 2, it is assumed that each data item includes at least one but no more than three identifying characters that identify the data item as to subject matter. Furthermore, it is assumed that the identifying characters are all alphabetic characters. These assumptions are based upon the selection of individual stocks from the listings of major exchanges, where each security is identified, in the quotations, by a symbol of three letters or less. It should be understood, however, that the program unit of the present invention is not dependent upon nor limited to use with a three-letter identification system. Rather, it may be employed with data items having any given maximum number $n$ of identifying symbols so long as the maximum number is known in advance.

The data editing system 10 further includes a program unit 17 which is coupled to each stage of the shift register 15 and which is also coupled to distributor 13. Program unit 17 constitutes the means employed in system 10 to establish the identity of each stock, commodity, or other data item that is to be selected and printed by the editing system. Thus, in a given application requiring monitoring of a selected number of individual stock quotations from a general quotation service, program unit 17 includes means for recording the identifications of all of the companies whose securities are to be monitored. Program unit 17 is particularly arranged to afford maximum latitude with respect to changes of the program recorded therein in order to provide for monitoring of different groups of stocks, commodities, or the like in accordance with varying requirements for different users. The output of program unit 17 is connected to the output control device 16 to control readout operations and to inhibit printing of any quotations other than those that have been pre-selected for monitoring purposes.

The readout control unit 16 is connected to a transmitter 18 that may be substantially similar to the initial data transmitter 11. Transmitter 18, in turn, is connected to a synchronized receiver or distributor 19 that controls a quotation printer 20. Transmitter 18, distributor 19, and printer 20 may all be substantially conventional in construction. If desired, a tape punch, visual display, or other reproducing means may be substituted for printer 20.

In operation of the data editing system, stock market or commodity quotations are encoded and transmitted by transmitter 11 in accordance with a conventional start-stop multi-level permutation code as described above. The signals from the transmitter are conveyed over the transmission line 12 to the synchronized receiver 13 and may be printed in their entirety by the conventional quotation printer 14. At the same time, however, the received data are recorded, character by character, in the initial stage of shift register 15. Thus, as far as the data editing system 10 is concerned, distributor 13 comprises a source of data signals representative of individual data items, each data item in this system constituting a particular stock or commodity quotation. Moreover, and as noted above, each data item includes at least one identifying character but no more than $n$ such identifying characters, the assumption here being that $n=3$.

During each cycle of operation of distributor 13, six bits of code data are recorded in the initial stage of shift register 15, thereby recording a complete data character in the shift register. When each recording cycle is completed, the characters recorded in shift register 15 are compared, stage by stage, with the programming data in program unit 17. If the characters recorded in the first three stages of shift register 15 comprises alphabetic characters and correspond to a sequence of three characters recorded in program unit 17 as the identification of a particular stock or commodity to be monitored, program unit 17 energizes readout control device 16 to initiate a printing operation in the next cycle of the system. In the next cycle, the character recorded in the fourth stage of shift register 15 is transferred by the readout control unit 16 to transmitter 18 and, from the transmitter, is supplied to receiver 19 to actuate printer 20. In this manner, the first character of a selected quotation is printed.

The stock or commodity identification data in program unit 17 does not necessarily include three alphabetic characters for each stock or commodity to be printed out in printer 20. The program unit of the present invention, as described in detail hereinafter, can be easily and effectively encoded for operation of the readout control unit on the basis of one, two, or three specific alphabetic characters appearing in the required sequence to identify a particular stock or commodity. Accordingly, the program unit affords maximum versatility in operation, as discussed more fully hereinaftaer.

Once printing of a particular data item has been initiated, it is continued for each character throughout the time required for the printing of the identifying letters and the following numerical data which, together, afford a complete stock quotation and thus constitutes a complete data item for the system. When the last number is transferred from the shift register 15 through the readout control unit 16 to the transmitter 18, a printing cycle is complete. At this point, program unit 17 again compares its pre-recorded data item identification information with the data recorded in shift register 15. If the program unit determines that the alphabetic characters now recorded in the initial stages of the shift register do not correspond to a stock or commodity to be monitored, the program unit effectively functions to inhibit readout and printing for an indeterminate time. During this inhibition interval, program unit 17 compares its pre-recorded data with the characters recorded in the first three stages of the shift register during each cycle of operation. That is, a new comparison is made each time a new character is recorded in the initial stage of the shift register.

Ultimately, the alphabetic characters identifying another stock or commodity from the group to be monitored is recorded in the initial stages of shift register 15. When this occurs, program unit 17 again conditions readout control circuit 16 to initiate a further printing operation. Editing system 10 continues operation in this manner, with the result that quotation printer 20 prints only the quotations relating to the stocks or commodities identified by the pre-recorded information in program unit 17. Accordingly, the output from quotation printer 20 is a data listing of a limited and selected number of stocks or commodities, eliminating checking through all of the other stock or commodity quotations emanating from the general data transmitter 11.

In operation, the data editing system 10 takes advantage of certain representative characteristics of the data signals supplied thereto from distributor 13. Thus, in a series of stock quotations (or commodity quotations) the initial character of each data item constitutes a letter character that is preceded by one or more non-alphabetic characters, either numerals or punctuation marks such as periods. That is, when a new quotation is initiated in the continuing sequence of data signals, and the characters recorded in one or more of the first three stages of the shift register 15 constitute the identifying letter characters for a stock or commodity, a non-alphabetic character code is always recorded in the stage of the register preceding the identifying letter characters. This makes it possible to construct program unit 17 to prevent initiation of a readout and printing operation when the wrong kind of character is recorded in the preceeding stages of the shift register. Specifically, the program unit can prevent a readout and printing operation at any time when an alphabetic character rather than a numeric character is recorded in the fourth stage of the shift register. Moreover, it is convenient to construct the program unit to allow for identification of quotations based on one and two letter codes as well as three-letter codes.

By the same token, the final character of numerical data pertaining to a given quotation is succeeded by a period character code which is in turn followed by a letter character code beginning the next quotation. This makes it readily possible for program unit 17 to determine the end of a quotation that has been selected for printing by the system as accurately as it determines the beginning of a quotation. In conventional terminology in the art, system 10 utilizes the "L" functions of a conventional stock or commodity data transmission system to control, in part, the selective printing and editing operation.

Figure 3:
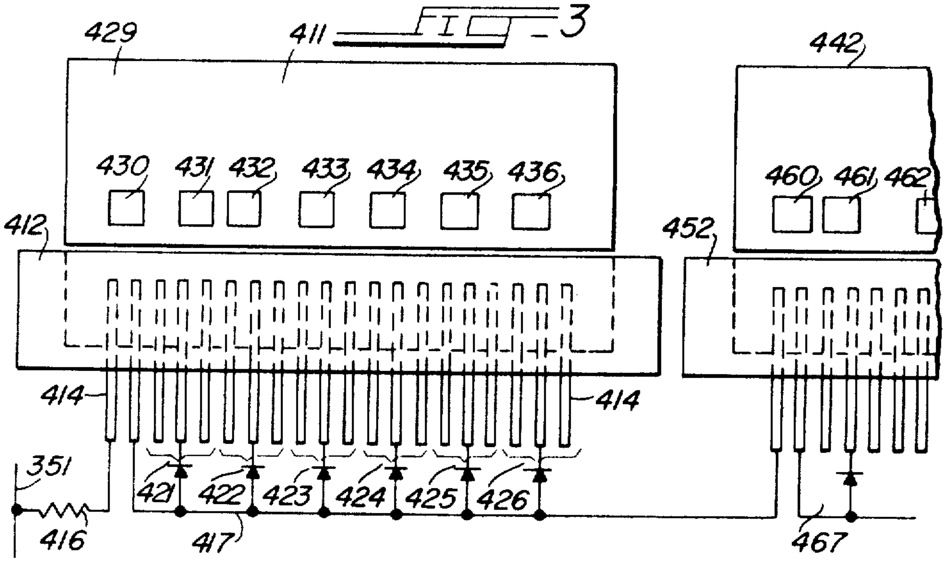
FIG. 3 is a partial elevation view, partly schematic, of electrical connector members and cooperating program members utilized in the program unit of FIG. 2.
Figure 4:
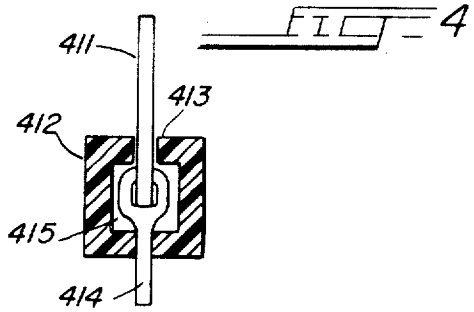
FIG. 4 is a partial sectional view taken approximately along line 4—4 in FIG. 3.
Figure 2:
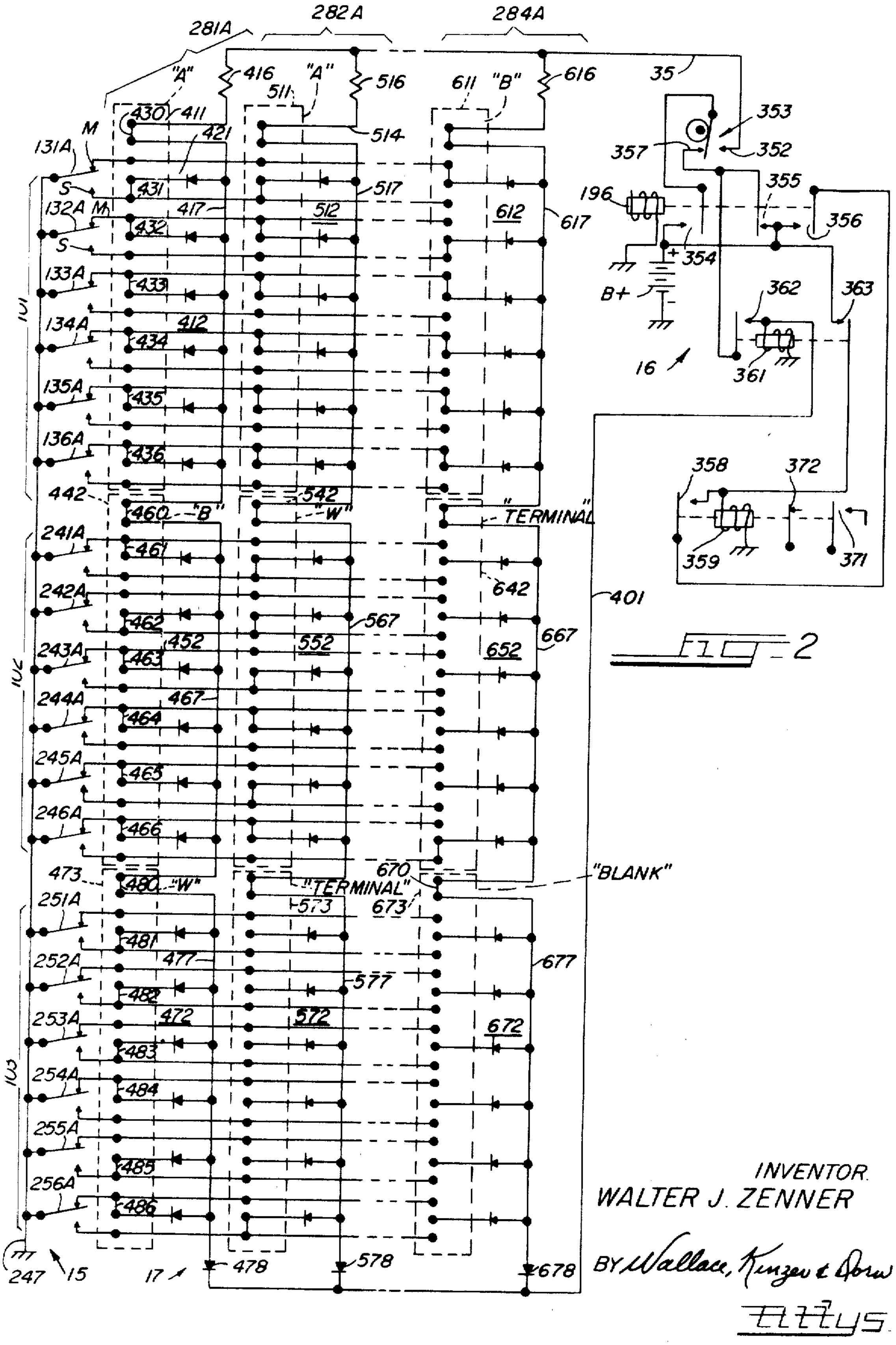
FIG. 2 is a schematic diagram of a program unit constructed in accordance with one embodiment of the present invention, together with other co-operating circuits.

FIG. 2 illustrates a program unit 17 constructed in accordance with one embodiment of a present invention, typical details of physical construction being illustrated in FIGS. 3 and 4. In FIG. 2, the program unit is shown schematically in conjunction with a typical readout control device 16 and a part of the shift register 15. The output control device 16, as illustrated in FIG. 2, constitutes the same readout control as described in the aforementioned Mero Patent No. 3,249,922; for convenience, the same reference numerals have been employed as in that patent.

Thus, the output control device 16 as shown in FIG. 2 comprises a main energizing conductor 351 that is connected to a normally open contact 352 of a control switch 353. Control switch 353 is operated in synchronism with distributor 13. The movable contact of switch 353 is connected to one contact of a normally open contact pair 354 for a relay 196 controlled by the sixth code level in the final stage of shift register 15. The other contact of pair 354 is connected to a suitable D.C. supply designated as B+.

Relay 196 also includes a pair of normally closed contacts 355 and a set of normally open contacts 356. One contact of pair 355 is connected to the B+ supply and the other contact of this pair is connected to a normally closed contact 357 in switch 353. One contact of the normally open set 356 is connected to B+ and the other is connected to one contact of a normally open pair 358 is a control relay 359.

Output control device 16, in the construction illustrated in FIG. 2, also comprises an additional control relay 361 having two pair of normally open contacts 362 and 363. One contact in pair 362 is connected to contact 357 in switch 353. The second contact of pair 362 is connected to the operating coil of relay 361, the coil being returned to ground. The second contact of pair 362 is also connected to a conductor 401 that leads to the program unit 17.

One of the contacts of pair 363 for relay 361 is connected to the B+ supply. The other contact of pair 363 is connected to one terminal of the operating coil for relay 359 and to the remaining contact of pair 358 in that relay. Control relay 359 further includes two additional sets of contacts 371 and 372 that are connected to the transmitter 18 (FIG. 1); the details of the interconnections between the output control device 16 and the transmitter 18 are described and illustrated in the aforementioned Mero Pat. No. 3,249,922 and hence are not repeated here.

The portion of shift register 15 that is illustrated in FIG. 2 comprises three groups 101, 102 and 103 of switching devices, each of the switching devices being shown as a single-pole double-throw switch. The first group 103 of the switching devices, constituting a part of the first level in the shift register, includes the switches 131A through 136A. Each of the switching devices 131A through 136A is shown in its normal or unactuated position. In operation, each of the switching devices is in the position shown in FIG. 2 when actuated to indicate the presence of a "mark" data bit in a particular character code. For a "space" bit, each of the switches is actuated to its alternate position. In FIG. 2, the contacts of certain of the switches have been designated as the "M" and "S" contacts, indicating the contacts that are closed for "mark" and "space" code designations.

The second group 102 of switching devices for the shift register 15, in the simplified form illustrated in FIG. 2, comprises the single-pole double-throw switches 241A through 246A. These switches, comprising the second level in the shift register, are each shown in the position corresponding to the presence of a "mark" data bit. Similarly, the third group 103 of switching devices comprising the single-pole double-throw switches 251A through 256A is shown in the drawing with each switch in the "mark" position. The movable contacts of all of the switching devices are electrically connected to a conductor 247 that is returned to system ground.

The physical construction adopted for the shift register 15 and for the groups of switching devices from the shift register, as illustrated in FIG. 2, is not critical to the present invention. Thus, electromagnetic relays as generally described in the aforementioned Mero Pat. No. 3,249,922 can be utilized and, if this is done, the switches 131A–136A, 241A–246A, and 251A–256A may constitute operating contacts of the relays. On the other hand, if a punch tape input is used for the system, the switching devices may constitute the sensing switches of a tape reader, in a system in which an electrical or electronic shift register is not employed but data is read from a punched tape. Furthermore, the switching devices may be electronic gate circuits instead of physical switches. For the program unit 17 as illustrated in FIG. 2, it is only necessary that the switching devices provide two terminals, one of which is effectively grounded for a "mark" code bit and the other of which is effectively grounded for a "space" bit.

The first stage 281A of program unit 17, as illustrated in FIG. 2, comprises a program member 411 that is encoded in accordance with a particular identifying character code. In the particular circuit shown in FIG. 2, program member 411 is encoded in accordance with the alphabetic character A, using the six-level ASCII code, selected solely for purposes of illustration. The program element 411 is removably mounted in an electrical connector member 412 as illustrated in FIGS. 2–4.

Connector member 412, as shown in FIGS. 3 and 4, comprises an insulating housing having a slot 413 for receiving a program member such as the program member 411. A total of twenty individual electrical connector elements 414 extend into a central opening 415 in the electrical connector member 412. Each of the connector elements 414 is provided with a C-shaped connector portion that engages the surface of the program element 411 when the program element is inserted into the electrical connector in the position shown in FIG. 4.

The first of the electrical connector elements 414 is connected to a resistor 416 that is connected to the energizing conductor 351. This first connector element is one of a pair with the next connector element in the series that is connected to a conductor 417 constituting a part of connector member 412.

The remaining connector elements 414 are arranged in groups of three each, identified in FIG. 3 as the groups 421 through 426. In each of the connector element groups 421 through 426, the central connector element is electrically connected to the conductor 417 through a blocking diode. The two outside electrical connector elements in each of the groups are each individually electrically connected to a respective terminal of one of the switching devices of the group 131A–136A. This electrical connection arrangement is illustrated in FIG. 2.

As shown in FIG. 2, the first connector element in group 421 is electrically connected to the "mark" terminal of the switching device 131A. The central connector in group 421 is connected to conductor 417 by a diode, as noted above. The remaining electrical connector element in group 421 is connected to the "space" terminal in the switching device 131A. This same connection pattern is followed for the electrical connector element groups 422 through 426.

Program member 411, as shown in FIGS. 3 and 4, is a simple printed circuit member comprising an insulator element 429 upon which there are formed a total of seven small conductive code areas 430 through 436. The position of the service conductor area 430 on the insulator 429 is such that, when the program member 411 is inserted in the connector member 412, an electrical circuit is completed between the first two electrical connector elements 414. Thus, insertion of program member 411 into connector 412 completes a series connection between resistor 416 and conductor 417, the connection extending through the first two connector elements 414.

The remaining conductive areas or elements 431 through 436 of the program member 411 complete selective connections within the electrical connector element groups 421 through 426 when the program member is mounted in the connector unit 412. Referring to FIG. 3, it is seen that insertion of the program member 411 into the connector 412 causes the conductive code area 431 to bridge the central and right-hand electrical connector elements of the group 421. This provides a code arrangement indicative of a "mark" code bit as explained more fully hereinafter. In the code for the character A, for which the program member 411 is encoded, all of the remaining code levels are "space" bits. Consequently, the conductive code elements 432 through 436 are each positioned on the insulator 429 so that, when the program member 411 is inserted in the connector 412, the left-hand connector element of the associated connector element groups 422 through 426 is electrically connected to the central connector elemet and hence to the diode that leads to the conductor 417. A comparison of FIGS. 2 and 3 will show that the electrical connections 430–436 of FIG. 2 are completed by the program member 411 when it is inserted in the connector 412.

The first stage 281A of program unit 17 further includes a second program member 442. The construction for the program member 442 is the same as for the program member 411 described above, except that a different array of conductive program elements 460–466 is utilized so that the program member 442 is encoded in accordance with the alphabetic character B. The code for the character B is a "space" bit followed by a "mark" bit and concluding with four "space" bits in the remaining code levels. The electrical connections afforded by the program member 442, when inserted in an electrical connector member 452 that is idetical in construction to the connector 412, are shown in FIG. 2.

A part of the program member 442 and a corresponding portion of the electrical connector member 452 are illustrated in FIG. 3. As shown in FIG. 3, program member 442 includes an initial conductive code element 460 that bridges the first two electrical connector elements of the connector 452. This completes an electrical circuit from the conductor 417 of the initial connector unit 412 to a corresponding electrical conductor 467 in the second connector member 452. As in the case of the first connector member, the remaining electrical connector elements in the connector unit 452 are arranged in groups of three with the central connector element in each instance being connected to the conductor 467 by means of a diode.

The initial stage 281A of program unit 17 (FIG. 2) further includes a third program member 473 that is similar in construction to the program members 411 and 442 but that is encoded in accordance with the code designation for the alphabetic character W. Program member 473 is removably mounted in a connector member generally designated by reference numeral 472 which includes a conductor 477 that is connected to the corresponding conductor 467 in the preceding connector member through the first two contacts of the connector member 472 and the first conductive element 480 of program member 473. In the particular code employed for the arrangement illustrated in FIG. 2, the code for the alphabetic character W is mark-mark-mark-space-mark-space, with the connections again being afforded by appropriately positioned conductive areas of elements 481–486 on the program member 473.

The conductor 477 in connector member 472 (FIG. 2) is electrically connected through a diode 478 to the conductor 401 that is returned to the coil of relay 361 in output control device 16. As explained more fully hereinafter, the complete initial stage 281A of program unit 17 affords an actuating circuit for the control relay 361 of the output control device 16, under certain specific operating conditions. Additional parallel actuating circuits for the output control device are afforded by the succeeding stages of the program unit, such as the additional stages 282A and 284A illustrated in FIG. 2. The program unit includes as many individual stages as there are stocks or commodities to be monitored by the editing system. In a typical installation, there may be twenty, thirty, or more stages in the program unit, although only three have been shown specifically in FIG. 2.

Stage 282A of program unit 17 is essentially similar to stage 281A as described in detail above. It comprises a resistor 516 that is connected from the line 351 to the initial connector element 514 in a first electrical connector member 512. Connector member 512 may be identical in construction to connector 412 and is connected to the switching devices 131A–136A in the same manner as the previously described electrical connectors. Connector 512 includes a conductor 517 that is connected through individual diodes to the central electrical connector elements in each of the groups of three that correspond to the individual switching devices. As before, this first level in the second stage 282A of program unit 17 includes a program card or member 511 that is inserted in electrical connector 512 to complete the electrical connections indicative of a particular identifying character. In this instance, the character is again the alphabetic character A and, accordingly, the electrical connections are the same as described above for program member 511.

The second stage 282A of program unit 17 further includes a second electrical connector 552 comprising a conductor 567 connected through diodes to individual electrical connector elements of the connector. A program member 542 is inserted in the connector 552 to complete the electrical connections shown in FIG. 2. In this instance, the program member 542 is encoded in accordance with the code for the alphabetic character W so that the electrical connections are the same as for the program member 473.

The third level of the second stage 282A in program unit 17 includes an electrical connector 572 comprising a main conductor 577 that is connected through individual diodes to the central electrical connector element in each group of three connector elements for the connector unit. A program member 573 is inserted in the connector 572 to program this portion of the circuit. However, the program member 573 is not encoded in accordance with either an alphabetic or a numerical character. Rather, the code connections afforded by the program member 573 are arranged in accordance with a special "terminal" code. This code is blank through the first five positions, a "mark" code is employed in the sixth position. Consequently, with the arrangement shown in FIG. 2, the second stage 282A of program unit 17 is encoded with respect to a stock or commodity designation that includes only two identifying alphabetic characters. That is, the special "terminal" coding for program member 573 is utilized to condition this portion of the program unit for recognition of a two-letter stock or commodity identificaation instead of the usual three-letter identification. Conductor 577 of electrical connector unit 572 is connected through a diode 578 to conductor 401.

The third stage 284A of program unit 17, in the form illustrated in FIG. 2, is essentially similar to the preceding stages as described above except for the programming. Thus, stage 284A comprises a resistor 616 that connects the conductor 351 to an electrical connector member 612, connector 612 including the series conductor 617. Connector 612 has inserted therein a program member 611 that is encoded in accordance with the alphabetic character B. The next level in stage 284A includes a connector member 562 including a main conductor 667. Connector 652 has inserted therein a program member 642 that is encoded in accordance with the terminal code described above. The third level of program unit stage 284A comprises an electrical connector unit 672 that includes a main conductor 677. In the connector unit 672 there is inserted a program member 673. Program member 673 is a blank; it has no conductive code areas, such as the conductive areas 431–436 (FIG. 3) and thus affords no electrical connections to the switching devices 251A–256A. However, the program member 673 does have a single electrically conductive code element or area 670, located in the same position as the conductive area 430 (FIG. 3), to provide a connection between the main conductors 667 and 677 of the electrical connector members 652 and 672, respectively (FIG. 2). The series conductor 677 of electrical connector 672 is connected through a diode 678 to the line 401.

In the illustrated circuit, all of the code character groups, comprising the stages 281A, 282A and 284A, have a common output, conductor 401. It will be recognized, however, that a separate output or actuating circuit can be provided, in each instance, depending upon the construction adopted for the output control means actuated by the program unit.

Operation of program unit 17 and its actuation of the output control means, device 16, can now be considered. In this regard, it should be understood that relay 196 is energized whenever a non-alphabetic character is recorded in the output stage of shift register 15, this being a subsequent stage beyond level 103 in the shift register. The cam actuated switch 363 is actuated once in each cycle of system operation. In those instances in which relay 196 has been energized, the closing of the movable contact of switch 353 upon its fixed contact 352 completes a circuit from the B+ supply through the now-closed contacts 354 of the relay and through switch 353 to the main energizing conductor 351.

At a given point in operation of the system, the three alphabetic characters WBA representative of the program established by program members 411, 442 and 473 in the first stage 281A of program unit 17 may be recorded in the first three stages or levels of shift register 15 as represented by switching device groups 101, 102 and 103. Under these conditions, switch 131A remains in the position illustrated in FIG. 2, since the first code level bit for the character A is a "mark" bit. The remaining switches 132A–136A in group 101, however, are all actuated to their alternate positions, each switch indicating a "space" bit in the data code. It is thus apparent that no electrical connections are provided, between the connector member 411 and the switching devices of group 101, between conductors 417 and 247.

With the code character B recorded in switching device group 102 of shift register 15, switching device 242A is actuated to its "mark" condition, since the second-level code bit for the letter B is a "mark" bit. The switches 241A and 243A through 246A are all actuated to their "space" conditions. Thus, the electrical connections afforded by the code program conductor elements 461–466 of program member 442 do not complete an electrical connection from conductor 567 through any of the switches 241A–246A to the grounded conductor 247.

The result is the same in the third level of the initial stage 281A of program unit 17. With the code for the alphabetic character W recorded in switching device group 103, the switching devices 251A, 252A, 253A and 255A are actuated to their positions corresponding to "mark" data bits. Switches 254A and 256A, on the other hand, are actuated to their "space" positions, indicating space bits in the fourth and sixth code levels in accordance with the code for the letter W. Again, therefore, there are no electrical connections completed through connector 472 and the associated program member 473 to the conductor 247. Consequently, a complete electrical circuit is established from conductor 351 through resistor 416 and conductors 417, 467 and 472 to diode 478 and back through conductor 401 to energize control relay 361 in readout control device 16.

It should be noted that an energizing circuit for control relay 361 as described above is a unique circuit that can be completed only when the complete code for the three designated alphabetic characters WBA is recorded in the switching devices constituting groups 101, 102 and 103 respectively. To illustrate the unique character of the circuit, it may be assumed that the code for the character A is not fully presented in the switching device group 101 and that, for example, switching device 134A has not been actuated to its "space" position. Under these circumstances, an electrical circuit would be completed from conductor 247 through switch 134A and code element 434 of program member 411 to conductor 417, which is one of the principal conductive elements in the energizing circuit of stage 281A. This effectively shunts the energizing circuit to ground and prevents energization of relay 361. It is thus seen that only when the precise code represented by the program elements 411, 442 and 473 is recorded in the switching device groups 101, 102 and 103, respectively, that the control relay 361 in readout control device 16 can be energized.

Actuation of control relay 361 closes its contacts 362 and 363. The closing of contacts 363 energizes the second control relay 359 of the readout control device 16 and closes contacts 358. The closing of contacts 358 establishes a holding circuit for relay 359 that is independent of relay 361 and that is held closed as long as the contacts 356 of relay 196 are maintained closed.

Later in the same cycle of operation, switch 353 returns to its original operating condition, opening contacts 352. But contacts 357 close before contcats 352 open, so that a holding circuit for relay 361 is completed through its contacts 362 and through switch contacts 357. Thus, the energizing circuit for relay 359 is also maintained as long as relay 361 is energized.

The operation of read out control device 16 continues, as described in detail in the aforementioned Mero Patent No. 3,249,922, to provide for a complete print-out of the alphabetic characters WBA and any succeeding non-alphabetic characters, including punctuation and numerical characters. In each cycle of operation, a new character code is advanced to the final stage of shift register 15, supplied to transmitter 18, and printed by receiver 19 actuating the printer 20 (FIG. 1). This mode of operation goes forward until a complete quotation is printed out, at which time the printing operation is interrupted unless a new energizing circuit is established through one of the parallel energizing circuits afforded by the individual stages of program unit 17.

The operation for stage 282A of program unit 17 is the same as for stage 281 except that in this instance it is only necessary to recognize two alphabetic characters W and A in sequence with any non-alphabetic code character. Inasmuch as it is customary practice to use non-alphabetic characters before and after the letters identifying each quotation, stage 282A is effective to establish the presence of the short identification WA, the energizing circuit being developed in the same manner as described above. Code member 573 distinguishes all non-alphabetic characters from letter characters. Again, if the code data recorded in the switching devices of groups 101, 102 and 103 does not exactly match the program for stage 282A as established by program members 511, 542 and 573, a shunt circuit is established through one or more of the switching devices to the grounded conductor 247, preventing actuation of the output control device 16 and specifically preventing energization of relay 361 in that device. Thus, a three-letter code (e.g. TWA) cannot cause a spurious, unwanted operation.

The final stage 284A of program unit 17, as illustrated in FIG. 2, functions in the same manner. In this instance, the first program unit stage recognizes the presence of the alphabetic character B recorded in the switching device group 101 of the first level of shift register 15. A non-alphabetic code is identified by means of the electrical connections afforded through the "terminal" code member 642, which merely distinguishes alphabetic and non-alphabetic codes. The blank program member 673 provides for completion of the electrical circuit between conductors 667 and 677 but does not employ a specific code designation, since the particular code recorded in switching device group 103 is immaterial in this instance and should not prevent completion of the energizing circuit.

The versatility and simplicity of operation afforded by program unit 17 provide material advantages in comparison with other forms of program apparatus. For example, in a given instance the editing system 10 may be constructed with a maximum capacity of thirty individual stages in the program unit. If a user desires to monitor only fifteen stocks or commodities, it is only necessary to insert program members identifying those particular stocks or commodities, in a manner analogous to the insertion of index cards, in any fifteen stages of the program unit. The remaining stages of the program unit will not affect operation of the system because they all remain open-circuited. Stated differently, it requires a positive action on the part of the user to encode the program unit to provide for print-out of a particular stock or commodity but no erroneous operation occurs if a part of the program unit is not used.

It is a simple matter to change the programming in any stage of the program unit 17 to conform to the code designation for a new or different stock or commodity. The three individual printed circuit "cards" or program members for that stage are simply removed and replaced by the proper sequence of code members identifying the alphabetic characters for the new or different stock or commodity. Thus, the monitoring or editing program can be changed completely in a matter of minutes even in a system having a capacity of as many as twenty or thirty different stocks or commodities. Furthermore, and as described above, the program unit readily accommodates itself to stock or commodity identifications including any number of alphabetic characters up to a total of three.

Of course, the program unit of the present invention is not confined to a system in which the maximum number of alphabetic identification characters for each stock or commodity is three. Identification symbols incorporating larger numbers of characters can be accommodated by adding further stages to the shift register to afford additional groups of switching devices and by adding additional corresponding levels in each stage of the program unit. That is, if there are a maximum of *n* characters identifying each quotation, there must be at least *n* levels in the program unit 17 and at least *n* groups of switching devices that are actuated in accordance with the received data signals representing the quotations. Preferably, and as described above, there is one additional stage in the shift register comprising the switching devices, used for readout purposes.

It will also be apparent that it is not essential that all of the identifying characters be alphabetic characters. Thus, mixed alpha-numeric identification can be achieved by program unit 17, depending only upon the encoding of the program members such as members 411, 442, 473, 511 etc. With the particular readout control device 16 illustrated in FIG. 2, it is necessary that the last symbol be an alphabetic character, but this limitation is not a limitation of the program unit, which can function on the basis of either alphabetic characters or numeric characters, or both intermixed, with an appropriate output control device.

The user of the editing system is provided with a font of individual program members such as the member 411 illustrated in FIG. 3, with duplication of characters as necessary, to enable him to condition program unit 17 for any desired number and variety of quotations within the capacity of the system. Program members constructed in the form illustrated for member 411 in FIG. 3 are particularly advantageous where the program members are to be interchangeable in a relatively large number of systems, and can be reproduced by silk screening, etching, or other familiar and economical printed circuit manufacturing techniques. There is little or no possibility of any error in the manufacture or use of the program members, since relatively wide tolerances can be established for location and alignment of the conductive code elements 430–436 on the program member and since the program member is not subject to mechanical abrasion or other adverse conditions when in use.

One minor modification that may be made in program unit 17, FIG. 2, pertains to the electrical connector members in the *n*th level, in this instance the third level, of each of the individual stages of the program unit. If it is desired to eliminate the necessity for insertion of a blank program member such as program member 673 in stage 284A where the data item to be monitored is identified by a single letter code, this can be accomplished by providing a direct electrical connection to the preceding connector member in the same stage of the program unit. If this is done in the final level of all stages of the program unit, there is never any necessity for the use of a blank program member. Specifically, the two initial series connector element in each connector member in the third and least level of the program unit would be directly connected to each other. Of course, it will be recognized that this requires no change in the program members; program members encoded for alphabetic characters or for a "terminal" code still provide the same operation as described above.

I claim:

1. A program unit for a data editing system of the kind comprising a source of data signals representative of data items, each data item including at least one but no more than *n* identifying characters and at least one non-identifying character, encoded in accordance with a given multi-level data code, switching means including *n* groups of switching devices actuated by said data signals, each group including one device for each code level, and an output control means, said program unit comprising:

a predetermined number of individual actuating circuits for said output control means, each of said actuating circuits affording a means for actuating said output control means to initiate a given output function;

a plurality of *n* electrical connector members for each actuating circuit, each connector member electrically connecting said actuating circuit to all of said switching devices in one of said groups; and a multiplicity of individutl program members, each encoded in acordance with a particular identifying character code, each program member being removably mountable in one of said electrical connector members to encode that connector member in accordance with the code for a particular identifying character, whereby each of said actuating circuits can only be completed in response to actuation of said switching devices in accordance with a specific desired combination of from one to *n* identifying characters.

2. A program unit for a data editing system, according to claim 1, in which each of said program members comprises a small separate insulator element having *n* isolated electrically conductive surface areas, one for each code level, the positions of said conductive areas effectively encoding the program member for a specific identifying character.

3. A program unit according to claim 1, for a data editing system in which each of said switching devices comprises a two terminal device actuatable between a first operating condition in which one of said terminals is effectively grounded and a second operating condition in which the other of said terminals is effectively grounded, said electrical connector members of said program unit each including a group of three connector elements for each switching device with two of the connector elements individually electrically connected to respective ones of the switching device terminals and the third connector element connected to a main series conductor in the actuating circuit, said program members each electrically connecting said third connector element of each group to only one of said first two connector elements.

4. A program unit according to claim 3 and further including blocking diodes interposed between the third connector elements and the main series conductors of said electrical connector members.

5. A program unit according to claim 3 in which each of said program members is a printed circuit having *n* isolated electrically conductive surface areas, the positions of said conductive areas encoding the connector member by electrically connecting the third connector element of each group to only one of said first two connector elements, and said program member further including a separate electrically conductive surface area connecting said connector member in series in one of said actuating circuits.

6. A program unit for a data editing system, according to claim 1, in which at least one connector member in each actuating circuit includes two normally open series connector elements that are electrically connected only by a program member mounted therein, whereby said actuating circuit cannot be completed in the absence of a program member in that connector member.

7. A program unit for a data editing system, according to claim 6, in which at least one of said program members is a blank program member that includes only one conductive element for interconnection of said two normally open series connector elements and makes no code connections within the remainder of the connector member.

8. A program unit for a data editing system, according to claim 2, and further comprising additional program members constituting terminal program members for terminating an actuating circuit for identification of a data item of less than *n* identifying characters, said terminal program members each having an electrically conductive surface area for only one code level, positioned to encode the terminal program member for all non-identifying characters.

References Cited

UNITED STATES PATENTS

| | | | |
|---|---|---|---|
| 3,233,224 | 2/1966 | Foster et al. | 340—172.5 |
| 3,315,234 | 4/1967 | Ruth | 340—172.5 |

PAUL J. HENON, Primary Examiner

M. E. NUSBAUM, Assistant Examiner